(12) United States Patent
Ye

(10) Patent No.: US 11,244,197 B2
(45) Date of Patent: Feb. 8, 2022

(54) FAST AND ROBUST MULTIMODAL REMOTE SENSING IMAGE MATCHING METHOD AND SYSTEM

(71) Applicant: SOUTHWEST JIAOTONG UNIVERSITY, Sichuan (CN)

(72) Inventor: Yuanxin Ye, Sichuan (CN)

(73) Assignee: SOUTHWEST JIAOTONG UNIVERSITY, Sichuan (CN)

( * ) Notice: Subject to any disclaimer, the term of this patent is extended or adjusted under 35 U.S.C. 154(b) by 113 days.

(21) Appl. No.: 16/639,046

(22) PCT Filed: Aug. 24, 2018

(86) PCT No.: PCT/CN2018/102271
§ 371 (c)(1),
(2) Date: Feb. 13, 2020

(87) PCT Pub. No.: WO2019/042232
PCT Pub. Date: Mar. 7, 2019

(65) Prior Publication Data
US 2020/0226413 A1    Jul. 16, 2020

(30) Foreign Application Priority Data
Aug. 31, 2017   (CN) .......................... 201710773285.6

(51) Int. Cl.
*G06K 9/62* (2006.01)
*G06K 9/46* (2006.01)

(52) U.S. Cl.
CPC ......... *G06K 9/6202* (2013.01); *G06K 9/4642* (2013.01); *G06K 9/6215* (2013.01)

(58) Field of Classification Search
CPC .. G06K 9/6202; G06K 9/4642; G06K 9/6215; G06K 9/0063; G06K 9/4604; G06K 9/522; G06K 9/4671; G06T 7/00
See application file for complete search history.

(56) References Cited

U.S. PATENT DOCUMENTS 6,057,892 A  *  5/2000  Borer ..................... H04N 5/145
                                                         348/699
9,454,700 B2 *  9/2016  Gottemukkula ... G06K 9/00617
(Continued)

FOREIGN PATENT DOCUMENTS

CN          103020945 A      4/2013
CN          104021556 A      9/2014
(Continued)

OTHER PUBLICATIONS

Yuanxin et al., "Robust Registration of Multimodal Remote Sensing Images Based on Structural Similarity", IEEE, May 2017 (Year: 2017).*

(Continued)

*Primary Examiner* — Aaron W Carter
(74) *Attorney, Agent, or Firm* — Novick, Kim & Lee, PLLC; Allen Xue

(57) ABSTRACT

A multimodal remote sensing image matching method and system integrate different local feature descriptors for automatic matching of multimodal remote sensing images. First, a local feature descriptor, such as the Histogram of Oriented Gradient (HOG), the local self-similarity (LSS), or the Speeded-Up Robust Feature (SURF), is extracted for each pixel of an image to form a pixel-wise feature representation map. Then, the three-dimensional Fourier transform (namely 3D FFT) is used to establish a fast matching similarity metric in a frequency domain based on the feature representation map, followed by a template matching scheme to achieve control points (CP) between images. In addition, the novel pixel-wise feature representation technique named channel features of orientated gradients (CFOG), which outperforms the pixel-wise feature representation methods based on the traditional local descriptors (Continued)

Figure 1:
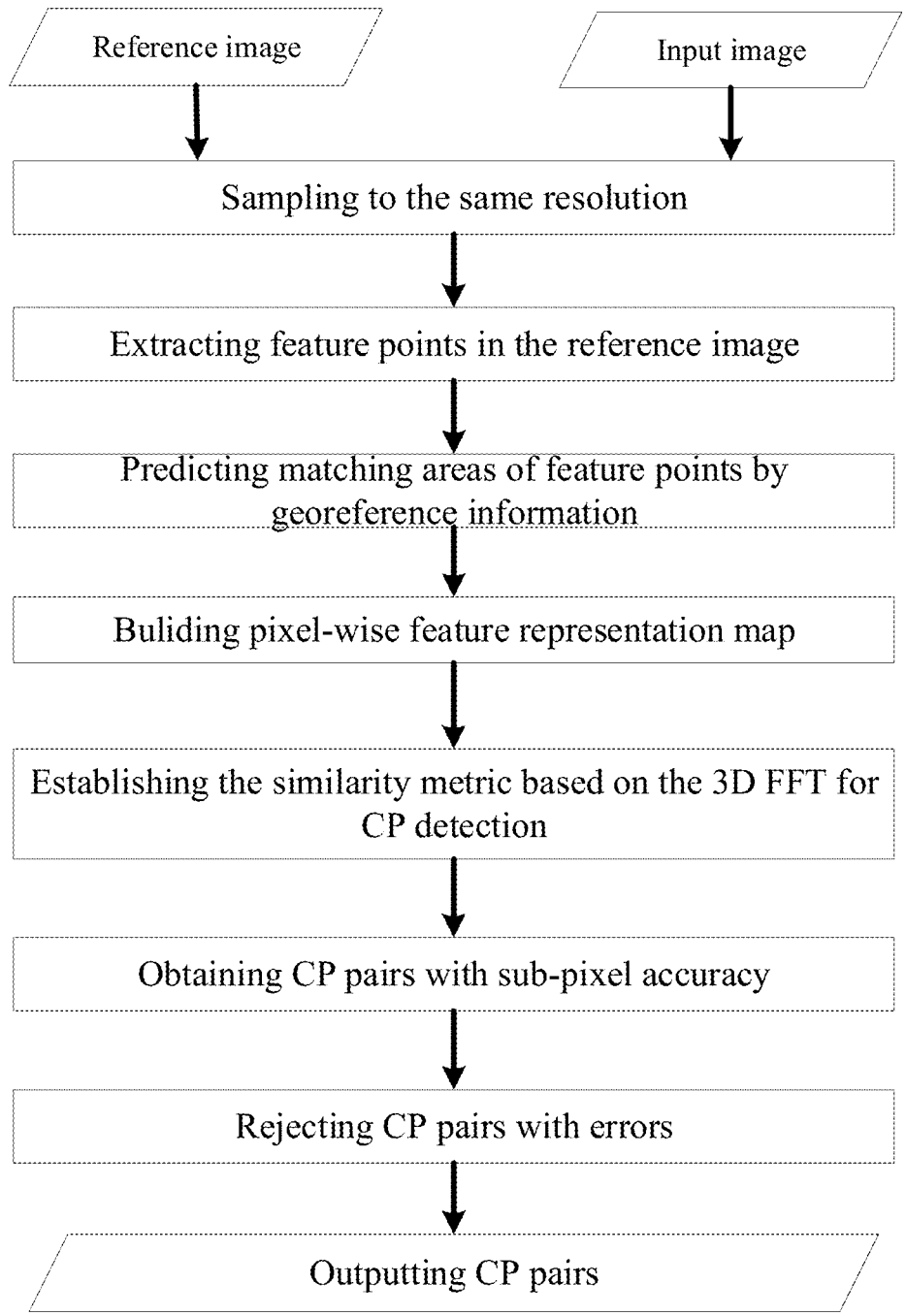

(e.g., HOG, LSS and SURF) in both matching performance and computational efficiency.

9 Claims, 2 Drawing Sheets

(56) References Cited

U.S. PATENT DOCUMENTS

| | | | |
|---|---|---|---|
| 10,902,553 B2* | 1/2021 | Dawson | G06T 3/0075 |
| 2008/0258724 A1* | 10/2008 | Mullick | G01R 33/56 |
| | | | 324/307 |
| 2011/0149267 A1* | 6/2011 | Welty | G06K 9/0063 |
| | | | 356/4.01 |
| 2011/0170781 A1* | 7/2011 | Bronstein | G06T 7/33 |
| | | | 382/190 |
| 2017/0243084 A1* | 8/2017 | Soatto | G06K 9/6267 |
| 2018/0053040 A1* | 2/2018 | Al-Osaimi | G06K 9/522 |
| 2019/0125247 A1* | 5/2019 | Saeki | A61B 5/02021 |
| 2019/0130595 A1* | 5/2019 | Elgersma | G05D 1/08 |
| 2020/0226413 A1* | 7/2020 | Ye | G06K 9/6215 |
| 2021/0164039 A1* | 6/2021 | Wang | C12Q 1/6874 |

FOREIGN PATENT DOCUMENTS

| | | |
|---|---|---|
| CN | 104574347 A | 4/2015 |
| CN | 104867126 A | 8/2015 |
| CN | 105427298 A | 3/2016 |
| CN | 106971404 A | 7/2017 |
| CN | 107563438 A | 1/2018 |
| CN | 107909018 A | 4/2018 |

OTHER PUBLICATIONS

Yuanxin et al., "Fast and Robust Structure-based Multimodal Geospatial Image Matching", IEEE, Dec. 2017 (Year: 2017).*
Google Translation of CN104021556A (Year: 2014).*

* cited by examiner

FAST AND ROBUST MULTIMODAL REMOTE SENSING IMAGE MATCHING METHOD AND SYSTEM

TECHNICAL FIELD

The present invention relates to the field of satellite image processing technology, in particular to an automatic matching method and system used for multimodal remote sensing images (e.g., visible light, infrared light, LiDAR, SAR and map).

BACKGROUND

Image matching aims to detect control points (CPs) or correspondences between two or more images, and it is a fundamental preprocessing step for many remote sensing image analyses such as image fusion, change detection and image mosaic. The accuracy of image matching has an important effect on subsequent analysis work. Current remote sensing sensors have global positioning system (GPS) and inertial navigation system (INS), and they can perform direct positioning and coarse matching to eliminate obvious rotation and scale differences between images, and make them only have an offset of a few pixels (e.g., dozens of pixels). However, multimodal remote sensing images (e.g. visible, infrared, LiDAR and SAR) have significant nonlinear radiometric differences due to different imaging mechanisms, thus the automatic CP detection remains very challenging.

In general, current image matching methods of multimodal remote sensing images can be divided into two categories: feature-based methods and area-based methods. Feature-based methods perform image matching by using the similarity of image features. Common features comprise point features, line features, and region features. Recently, the local invariant features such as Scale Invariant Feature Transform (SIFT) and shape context have been applied to remote sensing image matching. However, these methods require extraction of high-repeatability common features. The repeatability of feature extraction is often low for multimodal images because of significant radiometric differences. Therefore, these feature-based methods cannot effectively address the automatic matching of multimodal remote sensing images.

Area-based methods mainly use the template matching scheme, which uses some similarity metrics for CP detection. Accordingly, the selection of similarity metrics is crucial, and has an important impact on the accuracy of image matching. Common similarity metrics comprise sum-of-squared differences (SSD), normalized correlation coefficient (NCC) and mutual information (MI). These similarity metrics detect CPs using the intensity information of images, and are not suitable for multimodal remote sensing image matching with significant radiometric differences. Compared with intensity information, structure and shape properties of images look quite similarity. Recently, researchers have used some local descriptors such as Histogram of Orientated Gradient (HOG) and Local Self-Similarity (LSS) to extract structure and shape features of images. Moreover, they built the similarity metrics for image matching based on these features, which improves the performance of image matching. However, HOG and LSS only perform the feature representation construction in a sparse sampling grid rather than for per pixel, or they extract features in the neighborhoods of interest points. This makes the extracted features too sparse to precisely reflect common properties between multimodal images, and they are time-consuming. To this end, this invention method proposes a fast and robust multimodal remote sensing images matching method. The invented method can integrate different types of local feature descriptors for automatic matching of multimodal remote sensing images. Firstly, the invented method extracts a local feature descriptor such as HOG, LSS or Speeded-Up Robust Features (SURF) at each pixel of an image to form a dense pixel-wise feature representation map to reflect common structure, shape and texture properties between images. Then a fast similarity metric is built based on the feature representation map using the 3-dimensional (3D) Fast Fourier Transform (FFT) in the frequency domain. A template matching scheme is used to detect CPs. In addition, the invention also proposes a pixel-wise feature descriptor named Channel Feature of Orientated Gradient (CFOG) based on orientated gradient features, which is superior to the pixel-wise feature descriptors based on HOG, LSS and SURF in both matching performance and computational efficiency.

SUMMARY OF THE INVENTION

The invention aims to overcome the shortcomings of traditional matching methods, and provides a fast and robust multimodal remote sensing image matching method. The invented method extracts common structure, shape and texture features by a pixel-wise feature representation technique, and establishes a fast similarity metric based on the feature representation, which can rapidly and precisely detect a large number of evenly distributed CPs between images. In addition, the invention also construct a novel pixel-wise feature representation technique named Channel Feature of Orientated Gradient (CFOG).

On one hand, the present invention provides a fast and robust multimodal remote sensing images matching method, comprising the following steps:

A. determining resolution information between a reference image and an input image, and proceeding to step B for the same resolution, or sampling the images at the same resolution for different resolution;

B. detecting a series of uniformly distributed feature points in the reference image based on a partitioning strategy, denoting the points as $P_{1i}$ (i=1, 2, 3, . . . , N), and selecting a template area $AreaW_{1i}$ centered on the point $P_{1i}$;

C. predicting a matching area $AreaW_{2i}$ of a point set $P_{1i}$ (i=1, 2, 3, . . . , N) in the input image according to georeference information of remote sensing images;

D. building a pixel-wise feature representation map in the matching areas;

E. establishing a fast similarity metric for CP matching using 3D FFT based on the pixel-wise feature representation map;

F. obtaining a sub-pixel location for the CP by fitting the local extremum of the similarity map;

G. repeating steps C to F and traversing all the points of $P_{1i}$ (i=1, 2, 3, . . . , N) to obtain their corresponding CP pairs $\{PD_{1i}(x,y), PD_{2i}(x,y)\}$ (i=1, 2, 3, . . . , N) at sub-pixel accuracy;

H. rejecting the CP pairs with large errors from the $\{PD_{1i}(x,y), PD_{2i}(x,y)\}$ (i=1, 2, 3, . . . , N) to obtain the final CP pairs $\{PID_{1i}(x,y), PID_{2i}(x,y)\}$ (i=1, 2, 3, . . . , S).

The step D comprises the following steps: calculating a local feature descriptor (e.g., HOG, LSS or SURF) of every pixel according to image data of matching area; and then arranging a feature vector per pixel in Z direction to form a 3D pixel-wise feature representation map.

Further, the step D comprises building a CFOG in the matching areas, particularly comprising the following steps:

D1. for image data in the matching area, computing multiple orientated gradients for each pixel to form a 3D orientated gradient map;

D2. in a horizontal direction (i.e., X-direction) and a vertical direction (i.e., Y-direction), performing convolution operation based on the 3D orientated gradient map by using a Gaussian filter to generate a feature map $g_o^\sigma$, and performing convolution operation on the feature map $g_o^\sigma$ in the Z-direction by using a one-dimensional filter [1, 2, 1] to obtain a feature map $g_o^c$; and D3. normalizing the feature map $g_o^c$ to achieved the final CFOG map.

The step D of building the CFOG in the matching area comprises the following steps:

For all the pixels in the area, a one-dimensional filter [−1, 0, 1] and a one-dimensional filter $[-1, 0, 1]^T$ are used to calculate a horizontal gradient $g_x$ (in X-direction) and a vertical gradient $g_y$ (in Y-direction), respectively;

The $g_x$ and $g_y$ are used to calculate the gradient values $g_\theta$ of different directions by Formula (1).

$$g_\theta = \lfloor abs(\cos\theta \cdot g_x + \sin\theta \cdot g_y) \rfloor \quad (1)$$

where, $\theta$ is a quantized gradient orientation, abs represents an absolute value, $\lfloor\ \rfloor$ denotes that the enclosed quantity is equal to itself when its value is positive or zero otherwise;

The $g_\theta$ of all directions is first collected together to form a 3D orientated gradient map $g_o$; then, $g_o$ is convoluted by a 2D Gaussian filter by the standard of $\sigma$ in X-direction and Y-direction to achieve a feature map $g_o^\sigma$; and finally, $g_o^\sigma$ is convoluted by a one-dimensional filter [1, 2, 1] in Z-direction to form a feature map $g_o^c$;

Therefore, each pixel of the feature map $g_o^c$ corresponds to a feature vector f in Z-direction and is traversed to normalize the feature vector f by Formula (2) to obtain the final CFOG map; and $$f_i = \frac{f_i}{\sqrt{\|f_i\|^2 + \varepsilon}} \quad (2)$$

where, $\varepsilon$ is a constant to avoid division by zero.

The gradient orientation $\theta$ is divided into 18 equal parts in 360 degree. As a result, each part has degree of 20°. The $\theta$ is of $\{0°, 20°, \ldots, 340°\}$.

Further, the step E comprises converting the pixel-wise feature representation map into the frequency domain by using the 3D FFT, performing correlation operation to obtain a similarity map, and taking the position of the maximum of the similarity map as the image matching position. The Step E comprises the following steps:

obtaining the pixel-wise feature representation maps $D_1$ and $D_2$ for the area $AreaW_{1i}$, and the area $AreaW_{2i}$ by Step D; sliding the $D_1$ in the $D_2$ as a template, and matching $D_1$ and $D_2$ by taking the sum-of-squared differences (SSD) of feature vectors as the similarity metric;

the SSD is defined by Formula (3):

$$S_i(v) = \Sigma_c[D_1(c) - D_2(c-v)]^2 \quad (3)$$

where, c denotes a coordinate of a pixel in the feature representation map, v is the offset between $D_1$ and $D_2$, $S_i$ is the SSD of feature vectors between $D_1$ and $D_2$, and the offset $v_i$ between $D_1$ and $D_2$ can be obtained by minimizing the $S_i$, (i.e., matching position) by Formula (4):

$$v_i = \underset{v}{\operatorname{argmin}}\left\{\sum_c [D_1(c) - D_2(c-v)]^2\right\} \quad (4)$$

The Formula (4) can be expanded to obtain $$v_i = \underset{v}{\operatorname{argmin}}\left\{\sum_c D_1^2(c) + \sum_c D_2^2(c-v) - 2\sum_c D_1(c) \cdot D_2(c-v)\right\} \quad (5)$$

In Formula (5), as the first and second terms are nearly constant, the Formula (5) will be minimized when the third term is maximum; therefore, the similarity metric can be redefined as:

$$v_i = \underset{v}{\operatorname{argmax}}\left\{\sum_c D_1(c) \cdot D_2(c-v)\right\} \quad (6)$$

where, $\Sigma_c D_1(c) \cdot D_2(c-v)$ is a convolution operation.

the FFT in frequency domain is used to accelerate the computational efficiency because the convolution operation in the spatial domain become dot products in the frequency domain; thus, the similarity metric based on FFT is defined as:

$$v_i = \underset{v}{\operatorname{argmax}}\{F^{-1}[F(D_1(c)) \cdot F^*(D_2(c-v))]\} \quad (7)$$

where, F and $F^{-1}$ are the forward FFT and inverse FFT, respectively; F* is the complex conjugate of F. Since $D_1$ and $D_2$ are 3D feature representation maps; the Formula (8) is computed by 3D FFT according to the principle of convolution; and accordingly, the final similarity metric is defined as:

$$v_i = \underset{v}{\operatorname{argmax}}\{3DF^{-1}[3DF(D_1(c)) \cdot 3DF^*(D_2(c-v))]\} \quad (8)$$

where, 3DF and $3DF^{-1}$ denote the 3D forward FFT and inverse FFT, respectively. 3DF* is the complex conjugate of 3DF.

On the other hand, the present invention provides a fast and robust multimodal remote sensing matching system, comprising the following units:

a preprocessing unit for comparing resolution information of a reference image and an input image; if the resolutions of both images are the same, the system proceeds to the next unit; otherwise, these images are sampled at the sample resolution;

a template area selection unit for detecting a series of uniformly distributed feature points in the reference image; these points are denoted as $P_{1i}$ (i=1, 2, 3, . . . , N), and a template area $AreaW_{1i}$ centered on the point $P_{1i}$ is selected;

a matching area selection unit for predicting the matching area $AreaW_{2i}$ in the input image corresponding to point set $P_{1i}$ (i=1, 2, 3, . . . , N) by using the georeference information of remote sensing images;

a feature extraction unit for building a pixel-wise feature representation map in the matching area;

a preliminary matching unit for establishing a fast similarity metric for CP detection by using the 3D FFT based on the pixel-wise feature representation map; obtaining a sub-pixel location for the CP by fitting local extremum of the similarity map; repeating the operations involving the units and traversing all points of $P_{1i}$ (i=1, 2, 3, . . . , N) to obtain a CP pair $\{PD_{1i}(x,y), PD_{2i}(x,y)\}$ (i=1, 2, 3, . . . , N) at sub-pixel accuracy; and a fine-matching unit for rejecting the CP pairs with large errors from the $\{PD_{1i}(x,y), PD_{2i}(x,y)\}$ (i=1, 2, 3, . . . , N) to obtain the final CP pairs $\{PID_{1i}(x,y), PID_{2i}(x,y)\}$ (i=1, 2, 3, . . . , S)

Further, the feature extraction unit is used to calculate the local feature descriptor of each pixel covered by the image data of the matching area, and arrange all the feature vectors corresponding to all pixels in Z-direction to form the 3D pixel-wise feature representation map.

Further, the preliminary matching unit converts the pixel-wise feature representation map into the frequency domain by using the 3D FFT, obtains the similarity map based on correlation operation, and takes the position of the maximum of the similarity map as the image matching position.

In conclusion, with the technical solution, the advantages of the invention are as follows.

(1) The present invention proposes a fast and robust remote sensing images matching method. In the definition of the invented method, a local feature descriptor (e.g., HOG, LSS, or SURF) is extracted at each pixel of an image to generate the pixel-wise feature representation map, which can capture structure, shape and texture properties of multimodal images. Then a similarity metric for image matching is built based on the pixel-wise feature representation map. The invented method can rapidly and automatically detect a large number of uniformly distributed CPs among multimodal remote sensing images, and can effectively improve the performance of image matching. Moreover, the invented method is a common technique, and integrates different kinds of local feature descriptors for image matching (it is not limited to such local descriptors as HOG, LSS and SURF).

(2) In the invented method, the pixel-wise feature representation can be regarded as a new feature. It is built by extracting a local feature descriptor (e.g., HOG, LSS, or SURF) at each pixel of an image. The pixel-wise feature representation is different from the traditional local feature descriptors (e.g., HOG, LSS and SURF) which are sparse feature representations that only use the feature information of local region for feature description. In contrast, the pixel-wise feature representation of the invention can effectively reflect common structure, shape and texture properties among multimodal images. Therefore, the invention is robust to multimodal matching. Moreover, by the proposed similarity metric based on the pixel-wise feature representation, the invention can detect CPs among multimodal images rapidly and accurately.

(3) The invention also builds a novel pixel-wise feature descriptor (named CFOG) by using the orientated gradient information. CFOG is more accurate and computationally efficient compared with the pixel-wise feature representation based on the local descriptors such as HOG, LSS, SIFT and SURF.

(4) On the basis of the pixel-wise feature representation, the invention also establishes a fast similarity metric based on 3DFFT, which is more computationally efficient than the traditional similarity metrics commonly used in the spatial domain such as the sum-of-squared differences, the normalized correlation coefficient and the mutual information.

(5) Massive experiments have shown that the invention can achieve the matching accuracy of one pixel for flat areas, as well as the matching accuracy of 2.5 pixels for mountain and urban areas. For the large size remote sense images (more than 20000×20000 pixels), the run time of image matching is within 30 seconds. Moreover, the proposed method of the invention outperforms the popular remote sensing commercial software such as ENVI and ERDAS in both matching accuracy and computational efficiency.

BRIEF DESCRIPTION THE DRAWINGS

Figure 2:
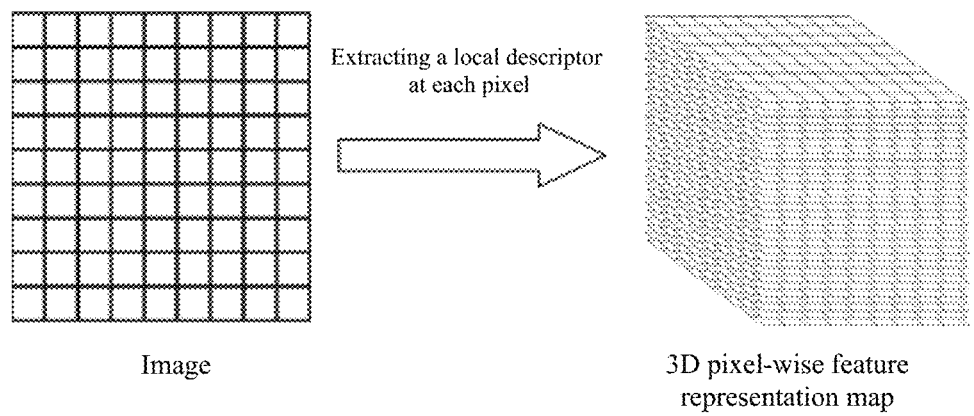
Figure 3:
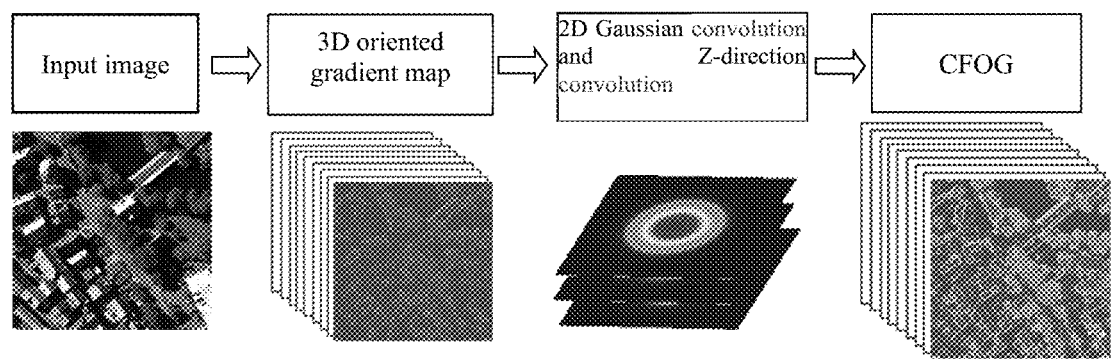

FIG. 1 is an overall flow chart of the invention.
FIG. 2 is a diagram of the pixel-wise feature representation.
FIG. 3 is a construction process of CFOG of the invention.

DESCRIPTION OF THE PREFERRED EMBODIMENTS

In order to enable those skilled in the art to understand the technical solution of the invention, the technical solution is clearly and completely described in combination with drawings. The embodiments of the application and all other similar embodiments obtained by those of ordinary skill in the art without making creative work are within the protection scope of the invention.

FIG. 1 shows a fast and robust multimodal remote sensing images matching method comprising the following steps:

Step A: determining consistency between resolutions of two images; if these resolutions are consistent, the method proceeds to the next step; otherwise, these images need to be processed at the sampling resolution; and Step B: extracting a large number of uniformly distributed feature points by using Harris or Forstner operator with a partitioning strategy in the reference image, particularly comprising: the reference image is divided into n×n non-overlapping square grids. In each region, the Harris or Forstner value is calculated for each pixel, and k pixels are selected with the largest Harris or Forstner values as the feature points. As a result, k feature points are detected from each grid and n×n×k feature points are extracted in the reference image, where the values of n and k are set according to actual conditions; and these feature points are denoted as $P_{1i}$ (i=1, 2, 3, . . . , N).

Note that image features can be extracted by other operators in other embodiments, and the present invention has no related limit.

Step C: based on the georeference information of remote sensing images, the search (or matching) area of the point set $P_{1i}$ (i=1, 2, 3, . . . , N) is determined in the input image, and the step C comprises the following steps.

(1) A point $P_{1i}(x,y)$ is selected from the point set $P_{1i}$ (i=1, 2, 3, . . . , N), where x and y denote the coordinates of $P_{1i}(x,y)$. Then a template area (named $AreaW_{1i}$) centred on $P_{1i}(x,y)$ is selected, and the area has a size of M×M pixels. The geographic coordinate of $P_{1i}(x,y)$ is denoted as $Geo_i$.

(2) According to the geographic coordinate $Geo_i$ and the georeference information of the input image, a point $P_{2i}(x,y)$ corresponding to the $P_{1i}(x,y)$ of the reference image is determined in the input image. Then a template area centred on $P_{2i}(x,y)$ having a size of M×M pixels is determined. This template area is regarded as the matching area $AreaW_{2i}$.

Step D: The pixel-wise feature representation is formed for the $AreaW_{1i}$ and $AreaW_{2i}$ (see FIG. 2). In an embodiment, the step D comprises the following steps.

A local feature descriptor (e.g., HOG, LSS or SURF) of every pixel in these areas is calculated. A feature vector per pixel in Z direction is arranged to form a 3D pixel-wise feature representation map. The embodiment has no limit for the local feature descriptor.

In another embodiment, step D comprises building the Channel Feature of Orientated Gradient (CFOG) for both the $AreaW_{1i}$ and $AreaW_{2i}$ (See FIG. 3), particularly comprising the following steps.

(1) For all the pixels in the area, a one-dimensional filter $[-1, 0, 1]$ and a one-dimensional filter $[-1, 0, 1]^T$ are used to calculate a horizontal gradient $g_x$ (in X-direction) and a vertical gradient $g_y$ (in Y-direction), respectively;

(2) The $g_x$ and $g_y$ are used to calculate the gradient values $g_\theta$ of different directions by Formula (1).

$$g_\theta = \lfloor abs(\cos\theta \cdot g_x + \sin\theta \cdot g_y) \rfloor \quad (1)$$

where, $\theta$ is a quantized gradient orientation. The $\theta$ is uniformly divided into 18 equal parts in 360 degree. As a result, each part has degree of 20°. The $\theta$ is of $\{0°, 20°, \ldots, 340°\}$. abs represents an absolute value and is used to convert the gradient information of $[180°, 360°)$ to $[0°, 180°)$ to mitigate the effects caused by gradient reversal between multimodal images. $\lfloor\ \rfloor$ denotes that the enclosed quantity is equal to itself when its value is positive or zero otherwise.

(3) The $g_\theta$ of all directions is first collected together to form a 3D orientated gradient map $g_o$. Then, $g_o$ is convoluted by a 2D Gaussian filter by the standard of $\sigma$ in X-direction and Y-direction to achieve a feature map $g_o^\sigma$. Finally, $g_o^\sigma$ is convoluted by a one-dimensional filter $[1, 2, 1]$ in Z-direction to form a feature map $g_o^c$.

(4) Each pixel of the feature map $g_o^c$ corresponds to a feature vector $f_i$ in Z-direction and is traversed to normalize the feature vector $f_i$ by Formula (2) to remove the influence of illumination changes and obtain the final CFOG map.

$$f_i = \frac{f_i}{\sqrt{\|f_i\|^2 + \varepsilon}} \quad (2)$$

where, $\varepsilon$ is a constant to avoid division by zero.

Step E: Based on the pixel-wise feature representation map, the invention establishes a fast similarity metrics for CP detection using 3D FFT, and step E comprises the following steps.

(1) By Step D, the pixel-wise feature representation maps $D_1$ and $D_2$ can be obtained for the area $AreaW_{1i}$ and the area $AreaW_{2i}$, respectively. $D_1$ is taken as a template and slides in $D_2$. The sum-of-squared differences (SSD) of feature vectors between $D_1$ and $D_2$ is taken as a similarity metric for matching. The SSD formula is simplified below and the matching process is accelerated by the 3D fast Fourier transform (FFT).

The SSD between $D_1$ and $D_2$ is computed by:

$$S_i(v) = \Sigma_c [D_1(c) - D_2(c-v)]^2 \quad (3)$$

Where, c is the coordinate of a pixel in the pixel-wise feature representation, v represents the offset between $D_1$ and $D_2$, and $S_i$ represents the SSD of feature vectors between $D_1$ and $D_2$. The offset $v_i$ (i.e., matching position) between $D_1$ and $D_2$ can be achieved by minimizing the SSD by Formula (4):

$$v_i = \operatorname*{argmax}_v \left\{ \sum_c [D_1(c) - D_2(c-v)]^2 \right\} \quad (4)$$

The Formula (4) is expanded to obtain:

$$v_i = \operatorname*{argmax}_v \left\{ \sum_c D_1^2(c) + \sum_c D_2^2(c-v) - 2\sum_c D_1(c) \cdot D_2(c-v) \right\} \quad (5)$$

In Formula (5), since the first and second terms are nearly constant, the formula will be minimized when the third term is maximum. Therefore, the similarity metric can be redefined as:

$$v_i = \operatorname*{argmax}_v \left\{ \sum_c D_1(c) \cdot D_2(c-v) \right\} \quad (6)$$

where, $\Sigma_c D_1(c) \cdot D_2(c-v)$ is a convolution operation, which can be accelerated by using FFT because convolutions in the spatial domain become dot products in the frequency domain. Hence, the similarity metric based on FFT is defined as:

$$v_i = \operatorname*{argmax}_v \{F^{-1}[F(D_1(c)) \cdot F^*(D_2(c-v))]\} \quad (7)$$

where, F and $F^{-1}$ are the forward FFT and inverse FFT, respectively, $F^*$ is the complex conjugate of F. Since $D_1$ and $D_2$ are 3D feature representation maps, the Formula (7) is computed by 3D FFT according to the principle of convolution. Accordingly, the final similarity metric is defined as.

$$v_i = \operatorname*{argmax}_v \{3DF^{-1}[3DF(D_1(c)) \cdot 3DF^*(D_2(c-v))]\} \quad (8)$$

Where, 3DF and $3DF^{-1}$ denote the 3D forward FFT and inverse FFT, respectively. $3DF^*$ is the complex conjugate of 3DF.

(2) When Formula (8) is used for image matching, $D_1$ and $D_2$ are first processed by the FFT to obtain $3DF(D_1)$ and $3DF(D_2)$, respectively. Then the dot product between $3DF(D_1)$ and the complex conjugate $3DF^*(D_2)$ of $3DF(D_2)$ are implemented, followed by taking an inverse 3D FFT to the results of the dot product to achieve the similarity map between $D_1$ and $D_2$. As a result, the maximum of the similarity map corresponds to the offset $v_i$ between $D_1$ and $D_2$, i.e., the offset between $P_{1i}(x,y)$ and $P_{2i}(x,y)$.

The X-direction and Y-direction offset of the obtained $v_i$ is denote as $(\Delta x, \Delta y)$, and the corresponding point $P_{2i}(x-\Delta x, y-\Delta y)$ of $P_{1i}(x,y)$ is denote as $P^*_{2i}(x,y)$. Accordingly, the obtained CP pair is denoted as $\{P_{1i}(x,y), P^*_{2i}(x,y)\}$.

Step F: For the CP pair $\{P_{1i}(x,y), P^*_{2i}(x,y)\}$, its sub-pixel accuracy is determined by a local fitting technique, and step F comprises the following steps.

(1) A local window of 3×3 pixels is selected centered around the $P^*_{2i}(x,y)$. Then, the similarity values of all pixels are collected to build the function relationship between the similarity metric values and the coordinates of pixels based on the principle of least squares by a quadratic polynomial.

(2) The partial derivative is taken for the quadratic polynomial to solve the position where the partial derivative is equal to 0. The position corresponds to a CP pair with sub-pixel accuracy which is denoted as $\{PD_{1i}(x,y), PD_{2i}(x,y)\}$.

Step G: The step C to the step F are repeated, each point of $P_{1i}$ (i=1, 2, 3, . . . , N) is traversed to achieve the CP pairs with sub-pixel accuracy which are denoted as $\{PD_{1i}(x,y), PD_{2i}(x,y)\}$ (i=1, 2, 3, . . . , N).

Step H: The final CP pairs are achieved by removing the CP pairs with large errors in $\{PD_{1i}(x,y), PD_{2i}(x,y)\}$ (i=1, 2, 3, . . . , N), and step H comprises the following steps.

(1) A projective transformation model is built by using the coordinates of $\{PD_{1i}(x,y), PD_{2i}(x,y)\}$ (i=1, 2, 3, . . . , N) based on the least square method.

(2) The root mean square errors (RMSEs) and residual errors of CP pairs are calculated, and the CP pair with the largest residual error is removed.

(3) Repeat the above two steps until the RMSE is less than 1.5 pixels, achieving the final CP pairs $\{PID_{1i}(x,y), PID_{2i}(x,y)\}$ (i=1, 2, 3, . . . , S) with the sub-pixel accuracy.

In another embodiment, the invention presents a fast and robust multimodal remote sensing images matching system, and the system comprises the following units.

a preprocessing unit for comparing resolution information of a reference image and an input image; if the resolutions of both images are the same, the system proceeds to the next unit; otherwise, these images need to be processed at the sampling resolution;

a template area selection unit for detecting a series of uniformly distributed feature points in the reference image by a partitioning strategy; these points are denoted as $P_{1i}$ (i=1, 2, 3, . . . , N), and a template area $AreaW_{1i}$ centered on the point $P_{1i}$ is selected;

a matching area selection unit for predicting a matching area $AreaW_{2i}$ in the input image corresponding to a point set $P_{1i}$ (i=1, 2, 3, . . . , N) by using the georeference information of remote sensing images;

a feature extraction unit for building a pixel-wise feature representation map in the matching area;

a preliminary matching unit for establishing a fast similarity metric for CP detection by using the 3D FFT based on the pixel-wise feature representation map; obtaining a sub-pixel location for the CP by fitting the local extremum of the similarity map; and repeating the operations involving these units and traversing all points of $P_{1i}$ (i=1, 2, 3, . . . , N) to obtain their corresponding CP pair $\{PD_{1i}(x,y), PD_{2i}(x,y)\}$ (i=1, 2, 3, . . . , N) at sub-pixel accuracy; and a fine-matching unit for rejecting the CP pairs with large errors from the $\{PD_{1i}(x,y), PD_{2i}(x,y)\}$ (i=1, 2, 3, . . . , N) to obtain the final CP pairs $\{PID_{1i}(x,y), PID_{2i}(x,y)\}$ (i=1, 2, 3, . . . , S).

Further, the feature extraction unit is used to calculate the local feature descriptor of each pixel covered by the image data of the matching area, and arrange all the feature vectors corresponding to all pixels in Z-direction to form the 3D pixel-wise feature representation map.

Further, the preliminary matching unit converts the pixel-wise feature representation map into the frequency domain by using the 3D FFT, obtains the similarity map based on correlation operation, and takes the position of the maximum of the similarity map as the image matching position.

These are the introduction of embodiments of the invention. Based on the matching frame proposed in the invention, different local feature descriptors (e.g., HOG, LSS and SURF) are used to build the effective pixel-wise feature representation, which effectively captures the common structure, shape and texture properties. Moreover, a novel similarity metric is established by 3D FFT based on the pixel-wise feature representation, and it is more computationally effective compared with the similarity metrics commonly used in the spatial domain (e.g. normalized correlation coefficient and mutual information). In addition, the proposed CFOG is a novel pixel-wise feature representation technique, which outperforms the other pixel-wise feature representation techniques based on HOG, LSS and SURF in both the matching efficiency and accuracy. The technical solution of the invention can fill the gap that traditional matching methods are sensitive to nonlinear radiometric differences between multimodal images, and can effectively address the matching difficulty of multimodal sensing images such as visible, infrared, LiDAR, SAR and raster map data.

The technical solution of the invention is a general technical frame that integrates different local feature descriptors (including but not limited to CFOG, HOG, LSS and SURF) for image matching.

The invention is not limited to the embodiments, and can expand to any new features or any new combination disclosed in the specification, and steps in any new method or procedure or any new combination disclosed.

What is claimed is:

1. A fast and robust multimodal remote sensing image matching method, comprising the following steps:
   A. comparing a resolution of a reference image and a resolution of an input image, when the two resolutions are the same; proceeding to step B, otherwise, resampling the reference image and the input image until they have a same resolution;
   B. detecting a series of uniformly distributed interest points in the reference image based on a partitioning strategy; denoting the points as $P_{1i}$ (i=1, 2, 3, . . . , N), and selecting a template area $AreaW_{1i}$ centered on point $P_{1i}$;
   C. predicting a matching area $AreaW_{2i}$ in the input image that corresponds to $P_{1i}$ according to georeference information of remote sensing image;
   D. building a pixel-wise feature representation map (D2) for the matching area $AreaW_{2i}$ and building a pixel-wise feature representation map (D1) for the template area $AreaW_{1i}$;
   E. establishing a fast similarity metric for control point (CP) detection using 3-Dimensional (3D) Fast Fourier Transform (FFT) based on the pixel-wise feature representation maps D1 and D2, which comprises converting the pixel-wise feature representation maps D1 and D2 into a frequency domain by using the 3D FFT, performing correlation operation to obtain a similarity map, and defining a position of the maximum of the similarity map as an image matching position;
   F. obtaining a sub-pixel location for the CP by fitting a local extremum of the similarity map;
   G. repeating steps C to F and traversing all the points of $P_{1i}$ (i=1,2,3, . . . ,N) to obtain a CP pair $\{PD_{1i}(x,y), PD_{2i}(x,y)\}$ (i=1, 2, 3, . . . , N) at sub-pixel accuracy for each point in $P_{1i}$ (i=1,2,3, . . . ,N); and
   H. rejecting the CPs with large errors from the $\{PD_{1i}(x,y), PD_{2i}(x,y)\}$ (i=1, 2, 3, . . . , N) to obtain the final CPs $\{PID_{1i}(x,y), PID_{2i}(x,y)\}$ (i=1, 2, 3, . . . , S).

2. The method of claim 1, wherein the Step D further comprises the following steps: calculating a local feature descriptor of every pixel according to image data of the matching area; and then arranging a feature vector for every pixel in Z direction to form a 3D pixel-wise feature representation map.

3. The method of claim 2, wherein the local feature descriptor is Histogram of Oriented Gradient (HOG), Local Self-Similarity (LSS), or Speeded Up Robust Features (SURF).

4. The method of claim 1, wherein the Step D further comprises building channel features of an orientated gradients (CFOG) map in the matching area, which comprises the following steps:

computing multiple orientated gradients for each pixel to form a 3D orientated gradient map for the image data in the matching area;

performing convolution operation based on the 3D orientated gradient map by using a Gaussian filter to generate a feature map $g_o^\sigma$ and performing convolution operation on the feature map $g_o^\sigma$ in the Z-direction by using a one-dimensional filter [1,2,1] to obtain a feature map $g_o^c$; and normalizing the feature map $g_p^c$ to obtain the CFOG map.

5. The method of claim 4, wherein the step of building CFOG further comprises the following steps:

for all the pixels in the area, calculating a horizontal gradient g(in X-direction) and a vertical gradient $g_y$ (in Y-direction), respectively, by using an one-dimensional filter $[-1,0,1]$ and an one-dimensional filter $[-1,0,1]^T$;

using the $g_x$ and $g_y$ to calculate gradient values $g_\theta$ of different directions by Formula (1);

$$g_\theta = \lfloor abs(\cos\theta \cdot g_x + \sin\theta \cdot g_y) \rfloor \quad (1)$$

wherein θ is a quantized gradient orientation, abs represents an absolute value, $\lfloor \; \rfloor$ denotes that the enclosed quantity equals itself when its value is positive or equals zero when its value is not positive;

collecting the $g_\theta$ of all directions together to form a 3D orientated gradient map $g_o$, then, performing the convolution operation on the $g_o$ by a 2-Dimensional (2D) Gaussian filter by the standard of σ in X-direction and Y-direction to achieve a feature map $g_o^\sigma$, and finally performing the convolution operation on the $g_o^\sigma$ by an one-dimensional filter [1,2,1] in Z-direction to form a feature map $g_o^c$, wherein each pixel of the feature map $g_o^c$ corresponds to a feature vector f in Z-direction and is traversed to normalize the feature vector f by Formula (2) to obtain the final CFOG map;

$$f_i = \frac{f_i}{\sqrt{\|f_i\| + \varepsilon}} \quad (2)$$

wherein ε is a constant to avoid division by zero.

6. The method of claim 1, wherein the step E comprises the following steps:

obtaining the pixel-wise feature representation maps $D_1$ and $D_2$ for the area AreaWi and the area AreaW$_{2i}$ by the Step D, respectively; sliding the $D_1$ in the $D_2$ as a template, and matching the $D_1$ and the $D_2$ by taking sum-of-squared differences (SSD) of feature vectors as a similarity metric, wherein the SSD is defined by Formula (3):

$$S_i(v) = \Sigma_c [D_1(c) - D_2(c-v)]^2 \quad (3)$$

wherein c denotes a coordinate of a pixel in the pixel-wise feature representation map $D_1$, v is the offset between the $D_1$ and the $D_2$, $S_i$ is the SSD of feature vectors between the $D_1$ and the $D_2$, and the offset $v_i$ between the $D_1$ and the $D_2$ is obtained by minimizing the $S_i$, (i.e., matching position) by Formula (4):

$$v_i = \underset{v}{\mathrm{argmax}}\left\{\sum_c [D_1(c) - D_2(c-v)]^2\right\} \quad (4)$$

expanding Formula (4) to obtain:

$$v_i = \underset{v}{\mathrm{argmax}}\left\{\sum_c D_1^2(c) + \sum_c D_2^2(c-v) - 2\sum_c D_1(c) \cdot D_2(c-v)\right\} \quad (5)$$

wherein, in Formula (5), the first and second terms are nearly constant, Formula (5) is minimized when the third term is maximum so that the similarity metric is redefined as:

$$v_i = \underset{v}{\mathrm{argmax}}\left\{\sum_c D_1(c) \cdot D_2(c-v)\right\} \quad (6)$$

wherein $\Sigma_c D_1(c) \cdot D_2(c-v)$ is a convolution operation;

the FFT in frequency domain is used to accelerate the computational efficiency because the convolution operation in the spatial domain become dot products in the frequency domain; thus, defining the similarity metric based on FFT as:

$$v_i = \underset{v}{\mathrm{argmax}}\{F^{-1}[F(D_1(c)) \cdot F^*(D_2(c-v))]\} \quad (7)$$

wherein F and $F^{-1}$ are the forward FFT and inverse FFT, respectively; $F^*$ is the complex conjugate of F; since the $D_1$ and the $D_2$ are 3D feature maps, the Formula (7) is computed by 3D FFT according to the principle of convolution; and accordingly, and obtaining the final similarity metric as:

$$v_i = \underset{v}{\mathrm{argmax}}\{3DF^{-1}[3DF(D_1(c)) \cdot 3DF^*(D_2(c-v))]\} \quad (8)$$

wherein 3DF and $3DF^{-1}$ denote the 3D forward FFT and inverse FFT, respectively, and 3DF* is the complex conjugate of 3DF.

7. A fast and robust multimodal remote sensing image matching system, comprising:

a preprocessing unit for comparing resolution information of a reference image and an input image;

which is followed by a next unit if the resolutions of the images are the same or sampling the images at the sample resolution if the resolutions of the images are different;

a template area selection unit for detecting a series of uniformly distributed feature points in the reference image, denoting the points as $P_{1i}$ (i=1,2,3, . . . ,N), and selecting a template area AreaW$_{1i}$ centered on the point $P_{1i}$;

a matching area selection unit for predicting a matching area AreaW$_{2i}$ in the input image corresponding to a point set $P_{1i}$ (i=1,2,3, . . . ,N) by using the georeference information of remote sensing images;

a feature extraction unit for building a pixel-wise feature representation map in the matching area;

a preliminary matching unit for establishing a fast similarity metric for control point (CP) detection by using the 3-Dimensional (3D) Fast Fourier Transform (FFT) based on the pixel-wise feature representation map, converting the pixel-wise feature representation map into a frequency domain by using the 3D FFT, performing correlation operation to obtain a similarity map, and taking the position of the maximum of the similarity map as the image matching position, and obtaining a sub-pixel location for the CP by fitting a local extremum of the similarity map; and repeating the operations involving the units and traversing all points of $P_{1i}$ (i=1,2,3, . . . ,N) to obtain their corresponding CP pairs $\{PD_{1i}(x,y), PD_{2i}(x,y)\}$ (i=1, 2, 3, . . . , N) at sub-pixel accuracy; and a fine-matching unit for rejecting the CP pairs with large errors from the $\{PD_{1i}(x,y), PD_{2i}(x,y)\}$ (i=1, 2, 3, . . . , N) (i=1,2,3, . . . ,N) to obtain the final CP pairs $\{PID_{1i}(x,y), PID_{2i}(x,y)\}$ (i=1, 2, 3, . . . , S).

8. The multimodal remote sensing image matching system of claim 7, wherein the feature extraction unit is used to calculate the local feature descriptor of each pixel for the image data of the matching area, and arrange all the feature vectors corresponding to all pixels in Z-direction to form the 3D pixel-wise feature representation map.

9. The multimodal remote sensing image matching system of claim 7, wherein the preliminary matching unit converts the pixel-wise feature representation map into the frequency domain by using the 3D FFT, obtains the similarity map by correlation operation, and takes the position of the maximum of the similarity map as the image matching position.

* * * * *